Aug. 25, 1953 — J. L. SJOLANDER — 2,650,086
SPRING DAMPENER
Filed Jan. 31, 1947
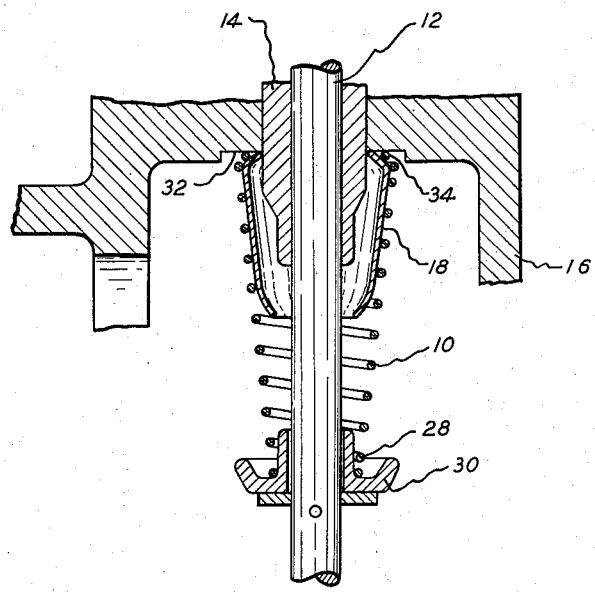
Fig. I.
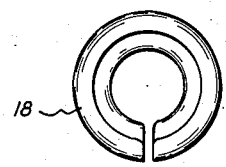
Fig. IV.
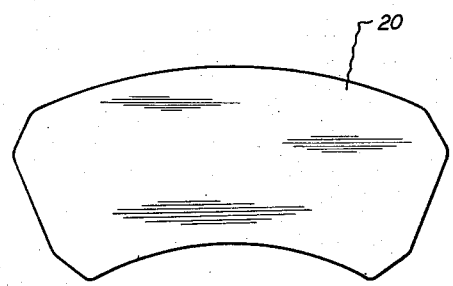
Fig. II.
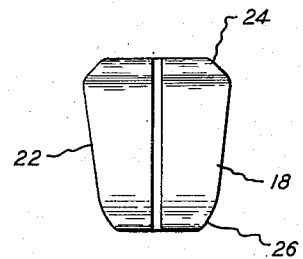
Fig. III.
Inventor
JOHN L. SJOLANDER
By Beaman & Patch
Attorneys Patented Aug. 25, 1953

2,650,086

UNITED STATES PATENT OFFICE 2,650,086

SPRING DAMPENER

John L. Sjolander, Cleveland, Ohio, assignor to Cleveland Wire Spring Company, Cleveland, Ohio, a corporation of Ohio Application January 31, 1947, Serial No. 725,546

1 Claim. (Cl. 267—1)

The present invention relates to improvements in spring dampeners of the type disclosed in my Patent No. 1,988,341, granted January 15, 1935.

It is the object of the invention to provide a dampener and spring assembly of a design in which the dampener is completely housed within the spring with the elimination of external flanges upon the dampener.

Another object is to provide an improved dampener and spring assembly for valves of internal combustion engines and the like in which the dampener is housed and positioned by the spring in the area of greatest vibration and lateral surge.

These and other objects and advantages residing in the combination, construction and arrangement of parts will be more fully understood from a consideration of the following specifications and the appended claim.

In the drawings,

Fig. I is a side elevational view partially shown in vertical cross-section, illustrating the invention applied to a valve spring, Fig. II is a development of the sheet metal form from which the dampener is shaped, Fig. III is a side elevational view of the dampener, and Fig. IV is a top view of Fig. III.

The coil spring 10, for the valve stem 12, is shown operating in a bushing 14 in the cylinder block 16. The dampener 18 is piloted on the lower end of the bushing 14.

As more clearly shown in Figs. II to IV, inclusive, dampener is fabricated from a resilient sheet metal blank 20 and shaped into a split bushing-like member having a conical central portion 22, a conical top portion 24, and a tapered lower end 26.

The spring 10 is of inverted frusto-conical shape with the lower end 28 piloted and supported on the seat 30. To protect the top portion 24 of the dampener 18 from pounding engagement with the recess 32, the top coil 34 of the spring 10 may be of lesser diameter as shown, to provide a pocket for the portion 24. It will be appreciated that the conical construction of the spring 10 and the dampener 18 will position the spring 10 in service as shown in Fig. I in the area of maximum surge and vibration.

By having the dampener 18 slightly larger in its unstressed condition than that portion of the spring 10 in which it is positioned, after being positioned, it will expand and by virtue of its own resiliency will exert a constant frictional pressure on the convolutions of the spring 10. This action will overcome or diminish the vibration of the spring 10 and obviate the tendency toward lateral surge in service.

By forming the dampener 18 as shown, the initial tooling cost is held to a minimum with low maintenance cost in service. It will also be appreciated that the use of all small punches in the fabrication of the sheet metal blank has been eliminated.

Having thus described my invention, what I claim as new and desire to cover by Letters Patent is:

A spring and dampener assembly comprising a conical coil spring, a split resilient metal bushing of generally conical shape expanded into said spring, said spring having a convolution of reduced size at one end thereof to form an abutment for one end of said bushing, said bushing having an in-turned flange at its larger end to engage with said abutment.

JOHN L. SJOLANDER.

References Cited in the file of this patent

UNITED STATES PATENTS

| Number | Name | Date |
|---|---|---|
| 904,490 | Lukens | Nov. 17, 1908 |
| 1,073,678 | Harvey | Sept. 23, 1913 |
| 1,928,678 | Sjolander | Oct. 3, 1933 |
| 1,952,102 | Sproul | Mar. 27, 1934 |
| 1,988,341 | Sjolander | Jan. 15, 1935 |
| 2,358,510 | Holland | Sept. 19, 1944 |